United States Patent [19]

Wood

[11] Patent Number: 4,927,071

[45] Date of Patent: May 22, 1990

[54] DOCUMENT CARRIER

[76] Inventor: Daniel J. Wood, 123 Calle Pena, Santa Fe, N. Mex. 87501

[21] Appl. No.: 329,520

[22] Filed: Mar. 29, 1989

[51] Int. Cl.[5] ........................ B65D 27/00; B65D 27/04; G06K 19/06

[52] U.S. Cl. ........................................ 229/71; 235/493

[58] Field of Search ............... 229/68 R, 71; 235/487, 235/493

[56] References Cited

U.S. PATENT DOCUMENTS

| | | | |
|---|---|---|---|
| 3,043,506 | 7/1962 | Bremer | 229/68 R |
| 3,576,972 | 5/1971 | Wood | 239/493 |
| 3,588,456 | 6/1971 | McNabb | 235/487 |
| 3,593,913 | 7/1971 | Bremer | 235/493 |
| 4,060,711 | 11/1977 | Buros | 235/493 |
| 4,128,202 | 12/1978 | Buros | 235/493 |
| 4,644,144 | 2/1987 | Chandek et al. | 235/494 |

*Primary Examiner*—Stephen P. Garbe

[57] ABSTRACT

This document carrier includes a front sheet and a back sheet which form a check receiving enclosure. The front sheet is formed of translucent or transparent material and permits the check to be read, photographed or microfilmed. The front sheet or the bottom sheet or both sheets are coated on the inside of the document carrier pocket with the bars of pressure sensitive adhesive of a type that does not require a liner over the adhesive to keep it from adhering to the opposite sheet. The pressure sensitive adhesive will peel easily from the opposite sheet permitting insertion of the check or other document. After the document is inserted, the adhesive on the back of the front sheet or on the front of the back sheet or on both sheets will hold the document in the document carrier. The left edge of the document carrier can be open allowing large documents to extend from the left side and not be folded. Small checks in large document carriers will not change position. In areas not filled by an inserted document, the document carrier will be held together by the pressure sensitive adhesive making the document carrier stronger.

7 Claims, 1 Drawing Sheet

DOCUMENT CARRIER

BACKGROUND OF THE INVENTION

This invention relates to document carriers for processing checks and other documents through automatic sorting equipment which operates by reading magnetic characters. The document carrier disclosed herein is an improvement over the document carriers described in U.S. Pat. Nos. 3,043,506, 3,431,404, 3,576,972, 3,588,456 and 3,593,913. As described in those patents, automatic sorting equipment is commonly used by banks, clearing houses and other institutions for sorting checks. However, several problems have arisen with respect to the prior art of document carriers.

For example, documents are often separated from the document carrier. Automatic sorting equipment often separates or tears apart the front and back sheets of document carriers. The front sheet often does not lie flat on the inserted document making the document difficult to read or microfilm. Long business size checks often must be folded to fit in document carriers when the left edge of the document carrier is glued permanently enclosed, but if the left edge is open the check will fly out during sorting. Small checks in large document carriers change position in the document carriers during processing causing jams on automatic sorting equipment.

SUMMARY OF THE INVENTION

This Document Carrier includes a front sheet and a back sheet which form a check receiving enclosure. The front sheet is formed of translucent or tansparent material and permits the check to be read, photographed or microfilmed. The front sheet or the bottom sheet or both sheets are coated on the inside of the document carrier pocket with the bars of pressure sensitive adhesive of a type that does not require a liner over the adhesive to keep it from adhering to the opposite sheet. The pressure sensitive adhesive will peel easily from the opposite sheet permitting insertion of the check or other document. After the document is inserted, the adhesive on the back of the front sheet or on the front of the back sheet or on both sheets will hold the document in the document carrier. The left edge of the document carrier can be opened allowing large documents to extend from the left side and not be folded. Small checks in large document carriers will not change position. In areas not filled by an inserted document, the document carrier will be held together by the pressure sensitive adhesive making the Document Carrier stronger.

OBJECTS

An important object of the present invention is a Document Carrier of simple construction from which the documents can not be inadvertently lost. A further object is a new and improved Document Carrier provided with pressure sensitive adhesive edges which help to retain the document. Other objects will be appreciated from the further detailed description of the invention.

The invention may be more readily understood by referring to the various figures of the drawing.

DESCRIPTION OF SPECIFIC EMBODIMENT

Figure 1:
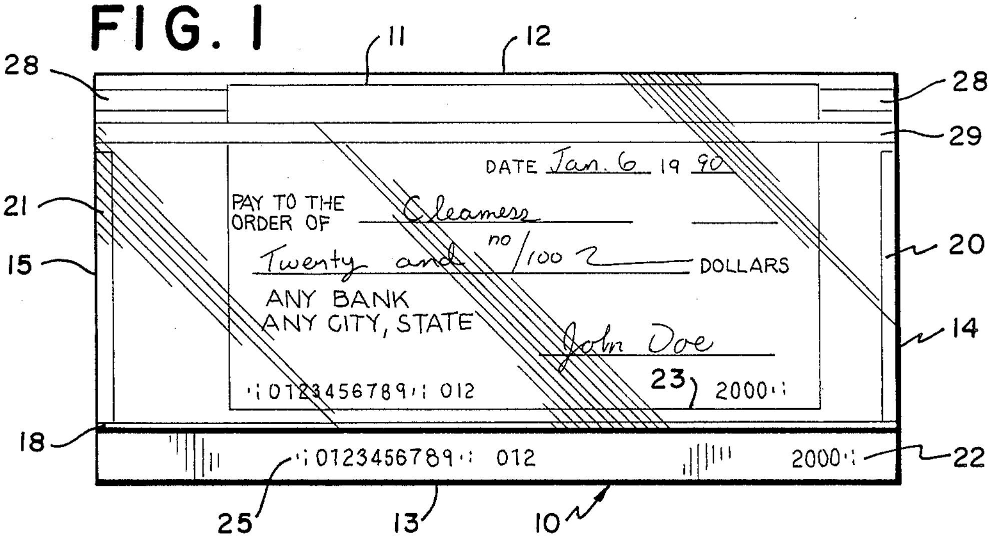
FIG. 1 is a front view of a Document Carrier made in accordance with the invention which is holding a check to be processed.
Figure 3:
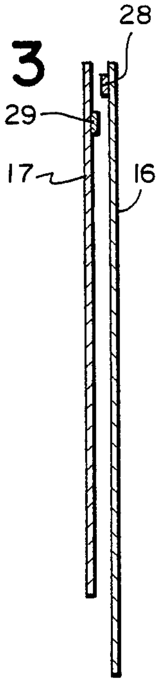
FIG. 3 is a sectional view taken along line 2—2 of FIG. 2.
Figure 2:
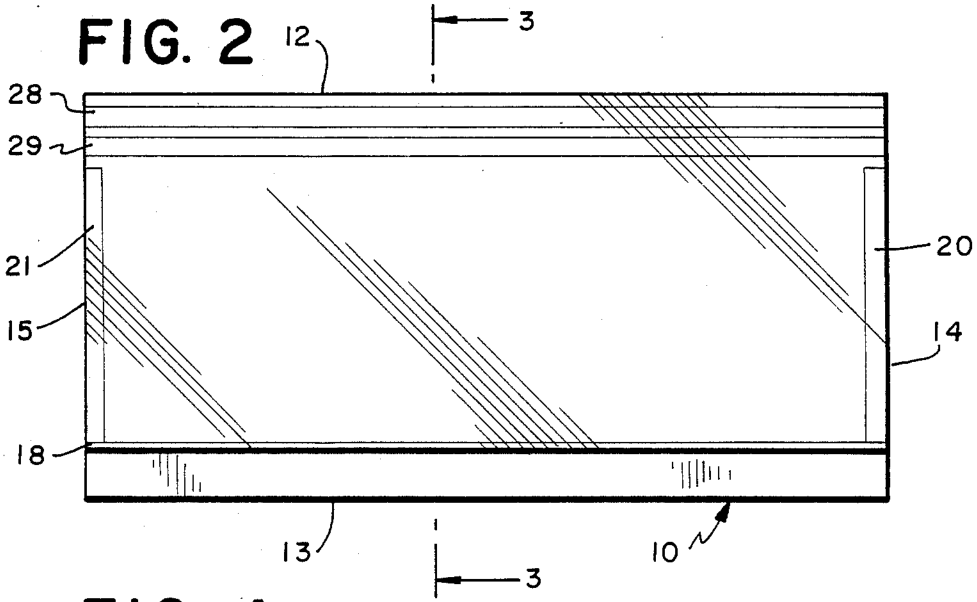
FIG. 2 is the same as FIG. 1, but without a check inserted in the Document Carrier.
Figure 4:
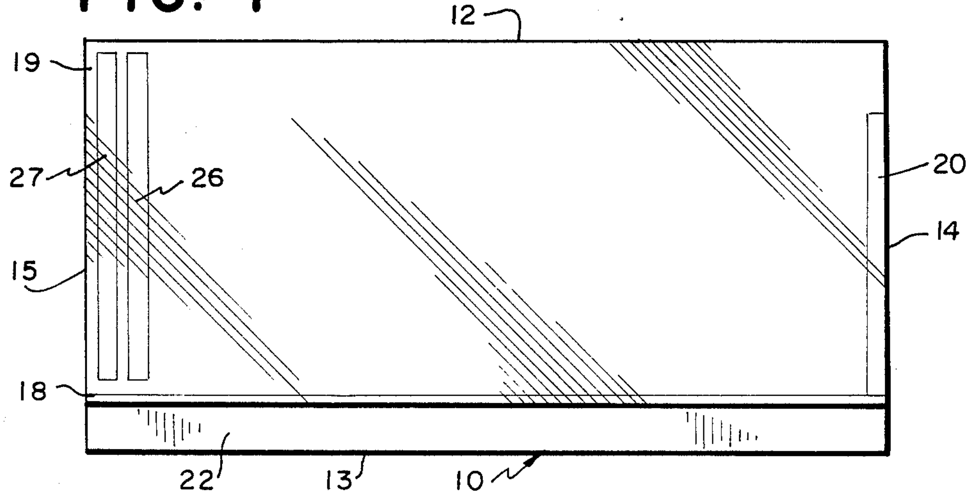
FIG. 4 shows a Document Carrier with pressure sensitive glue positioned at left side.

Referring to the drawing, the numeral 10 designates generally a document carrier or envelope in which is inserted a check 11 for processing. The document carrier is seen to be generally rectangular and is provided with relatively long top and bottom edges 12 and 13, respectively, and relatively short side edges 14 and 15.

The document carrier includes a rectangular back sheet 16 and a rectangular front sheet 17. The bottom of the top sheet is glued by a glue line 18, and the bottom of the top sheet is positioned approximately ⅝" above the bottom of the back sheet so that the magnetic indicia 25 which is applied to the document carrier by an encoding machine is on the portion of the back sheet 22 that extends down ⅝" below the front sheet. The back sheet 16 should be material that is strong enough to support the carrier as it passes through various banking machines such as automatic sorters, encoders and microfilmers, and 20 or 24 lb bond papers have been particularly satisfactory. The surface of the back sheet 16 should also be of a vellum type to accept the magnetic indicia from an encoding machine. The front sheet 17 is formed of translucent or transparent material through which the check 11 is easily read.

The front and back sheets are adhesively secured by glue lines along the bottom edge 18 of the top sheet and along at least one of the short sides 20 and 21 of the document carrier.

Pressure sensitive adhesive bars 26, 27, 28 and 29 are positioned to seal on inserted document in the document carrier. The pressure sensitive adhesive used must be of a type that permits the front sheet 17 and the back sheet 16 to be easily peeled apart to allow insertion of the document. The pressure sensitive glue bars 26, 27, 28 and 29 may be located on the back of the front sheet or the front of the back sheet or on both sheets, but they must be located inside the pocket or envelope formed into which the document is inserted.

The pressure sensitive adhesive will hold documents securely in the carrier, but since the adhesive is a type that will peel away from an attached surface, the document can be removed without damage because the carrier front and back sheets will peel away.

If the left edge 15 of the document carrier is left open at 19 large checks will not have to be folded when inserted in the carrier and the pressure sensitive adhesive bars 26,27,28 and 29 will hold the check securely in the carrier so that it will not be pulled out.

Small checks will be held in place by the pressure sensitive adhesive bars, and they will not shift position during processing. The pressure sensitive adhesive bars will hold the front sheet 17 against the inserted check insuring better quality reading and microfilming of the inserted check.

The pressure sensitive adhesive bars will hold the front and back sheets of the docment carrier securely together to give the carrier greater strength during processing on the bank equipment.

Whereas the foregoing disclosure describes various preferred embodiments of the invetion, it will be appreciated that many other variations can be made, making use of the principal of the invention without departing from the scope thereof.

Accordingly, I intend to be limited only by the following claims:

I claim:

1. The document carrier which comprises a rectangular back sheet and a rectangular front sheet, the back sheet being provided with a surface of vellum to accept magnetic indicia, said front sheet being formed of translucent material through which the document can be easily read, said front and back sheets being secured by glue lines along the bottom edge and along at least one side edge, pressure sensitive adhesive bars, positioned to seal an inserted document in said document carrier, the pressure sensitive adhesive bars being of a type that permits the front sheet and the back sheet to be easily peeled apart to allow insertion of the document, said bars being located inside the pocket into which the document is to be inserted, whereby the pressure sensitive adhesive will hold the document inside the carrier permitting the document to be removed without damage.

2. The document carrier of claim 1 wherein one side edge is left open permitting the insertion of large documents extending beyond the length of the carrier.

3. The document carrier of claim 1 wherein the pressure sensitive adhesive bars will hold the front sheet against the inserted document insuring better quality reading and microfilming.

4. The document carrier of claim 1 wherein the pressure sensitive glue bars are located on the back of the front sheet.

5. The document carrier of claim 1 wherein the glue bars are located on the front of the back sheet.

6. The document carrier of claim 1 wherein the glue bars are located on both sheets.

7. The document carrier of claim 1 wherein the pressure sensitive adhesive bars hold the front and back sheets of the document carrier securely together.

* * * * *